No. 880,939. PATENTED MAR. 3, 1908.
J. E. VIRGO.
NUT LOCK.
APPLICATION FILED JUNE 24, 1907.
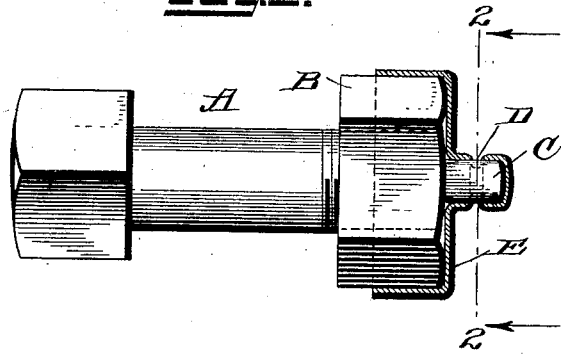
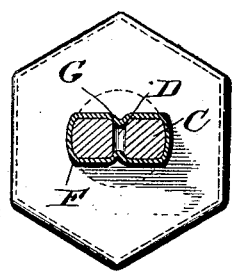
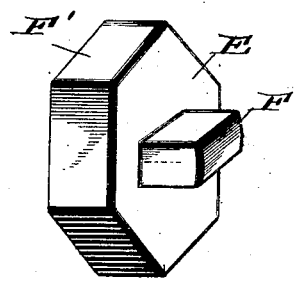
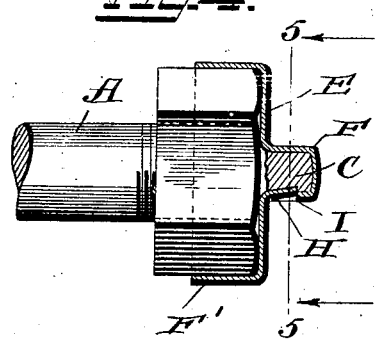
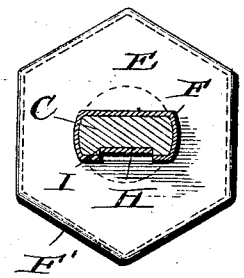
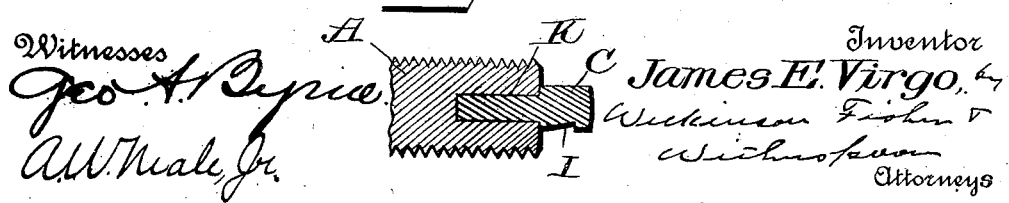
Witnesses
Geo. A. Dyer
A. W. Neale, Jr.
Inventor
James E. Virgo,
by Wilkinson Fisher
Wilkinson
Attorneys

UNITED STATES PATENT OFFICE.

JAMES EVANS VIRGO, OF BRIDGEPORT, CONNECTICUT.

NUT-LOCK.

No. 880,939.     Specification of Letters Patent.     Patented March 3, 1908.

Application filed June 24, 1907. Serial No. 380,575.

*To all whom it may concern:*

Be it known that I, JAMES EVANS VIRGO, a citizen of the United States, residing at Bridgeport, in the county of Fairfield and State of Connecticut, have invented certain new and useful Improvements in Nut-Locks; and I do hereby declare the following to be a full, clear, and exact description of the invention, such as will enable others skilled in the art to which it appertains to make and use the same.

My invention relates to a nut lock and its object is to produce a simple, safe, convenient and cheap nut lock which is readily applied and easily removed so that the bolt can be used when desired to perform the ordinary functions of a bolt.

To these ends my invention consists in a cap made of sheet metal provided with a cup shaped cavity in its bottom adapted to fit a projection or lug, on this bolt. This cap fits snugly over the nut on the bolt, and the cup fitting over the lug prevents the said cap from turning, so that the latter securely locks the nut in place, all as will appear more fully herein below.

Referring to the accompanying drawings forming a part of this specification:—Figure 1 is a view of my bolt showing the locking cap in section, and in place on the bolt. Fig. 2 is a sectional view, of the lug and cap of the lug, taken on the line 2—2 of Fig. 1. Fig. 3 is a perspective view of my cap and cup. Fig. 4 is a view similar to Fig. 1, but showing a modified form of the locking device between the cup and lug. Fig. 5 is a view similar to Fig. 2, but taken on the line 5—5 of Fig. 4, and Fig. 6 is a modification showing a different means of attaching the lug to the bolt.

Like letters refer to like parts in all the views.

A represents the bolt which may be of any suitable construction, B the nut, and C a lug projecting from the end of the bolt, which may be integral therewith or fastened thereto in any suitable manner, but it is preferably integral therewith. This lug C is provided with a recess D, preferably extending through the same.

E represents a cap which may be made of any suitable material, but which I prefer to make of soft steel, and which may be readily stamped out, at a cost not greatly exceeding the cost of the material. This cap E is made of the shape of the nut, and is provided with a cup, or depression F, or other means, adapted to fit snugly the lug C, when in place, and it is also provided with the square hexagonal or other shaped angular flange F¹ adapted to snugly fit the contour of the nut.

In the modified form shown in Fig. 4, I provide the lug C, with the recess H in one side, and slit the cup F to form the tongue I as shown.

In Fig. 6 I show the lug C, let into a recess K, formed in the head of the bolt A, and which may be secured therein in any suitable manner, as by welding.

In operation the nut is securely turned to its final position on the bolt, the cap E placed thereover, and in case of the preferred form, illustrated in Fig. 1, a portion of the cup F is crimped, or pinched down, thereby forming spring-like projections fitting into the recess D in the lug C, as clearly shown in Fig. 2. In this case the crimped or pinched portions G of the cup F securely hold the cap in place, prevent it from backing off the bolt, and therefore cause the cap to lock the nut firmly on the bolt. At the same time, the cap may be forcibly and readily removed at any time, the nut tightened, or loosened, and the cap replaced.

In the modification, shown in Fig. 4, the cap is likewise slipped over the nut; the tongue, or spring-like projection, I, is pinched into the recess H, as shown, and likewise holds the cap in lock-position. In this form the cap may, also, be readily removed and replaced after having adjusted the nut, by simply inserting a blade like instrument between the body of the cup and the edge or end of the tongue I, thereby springing or bending the same slightly and disengaging it from the recess H.

Having now described my invention, what I claim and desire to secure by Letters Patent, is:—

1. In a nut lock the combination of a bolt provided with a lug rigid therewith and extending from the end thereof in prolongation of the body of the bolt, a nut fitting the said bolt, and a sheet metal cap fitting said nut and provided with a cup fitting said lug, and interlocking means integral with said cup and engaging said lug, whereby the cap securely locks the nut on the bolt but is adapted to be readily removed and replaced, substantially as described.

2. In a nut lock, the combination of a bolt having a lug provided with a recess, integral therewith and extending from the end thereof, in prolongation of the body of the bolt, a nut on said bolt, and a sheet metal cap provided with angular flanges snugly fitting said nut, and also provided with a cup, or recess, snugly fitting said lug, and said cup provided with an integral spring-like projection fitting the recess in the lug, whereby the cap securely locks the nut on the bolt, but is adapted to be readily removed and replaced, substantially as described.

3. In a nut lock the combination of a bolt having a lug provided with a recess, integral therewith and extending from the end thereof, in prolongation of the body of the bolt, a nut on said bolt, and a sheet metal cap provided with angular flanges snugly fitting said nut, and also provided with a cup, or recess, snugly fitting said lug, and said cup provided with two spring-like depressions forming integral projections and fitting the recess in the lug, whereby the cap securely locks the nut on the bolt, but is adapted to be readily removed and replaced, substantially as described.

4. In a nut lock, the combination of a bolt provided with a lug rigid therewith and extending in prolongation of the body thereof, a nut provided with a plurality of angular surfaces fitting said bolt and a sheet metal cap provided with angular flanges fitting said surfaces and having a cup shaped depression in its bottom provided with integral spring means, and fitting said lug, whereby the cap may be readily removed, the nut adjusted, and the cap replaced in locking position, substantially as described.

5. In a nut lock, the combination of a bolt provided with a lug smaller in cross section than said bolt, rigid therewith and extending in prolongation of the body thereof, an angular nut fitting the said bolt, and a sheet metal cap provided with integral angular flanges fitting over the said nut and lug, and having integral spring locking means for engaging said lug, whereby the cap securely locks the nut on the bolt but is adapted to be readily removed and replaced, substantially as described.

In testimony whereof, I affix my signature, in presence of two witnesses.

JAMES EVANS VIRGO.

Witnesses:
   JAMES H. FLYNN,
   WILLIAM TRETEAVEN.